July 31, 1945.  J. L. HITE  2,380,648
COLLET JAW PROTECTOR
Filed Sept. 1, 1944  2 Sheets-Sheet 1

INVENTOR
JESS L. HITE
BY *Everett N. Curtis*
ATTORNEY

July 31, 1945.   J. L. HITE   2,380,648
COLLET JAW PROTECTOR
Filed Sept. 1, 1944   2 Sheets-Sheet 2
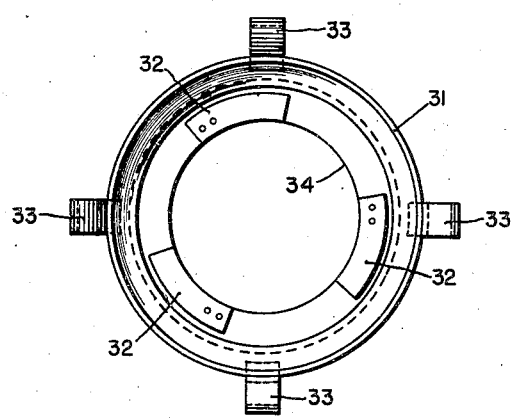
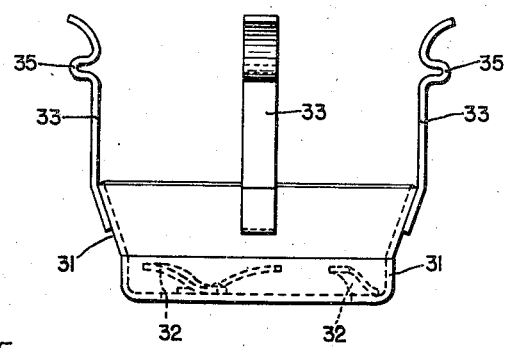
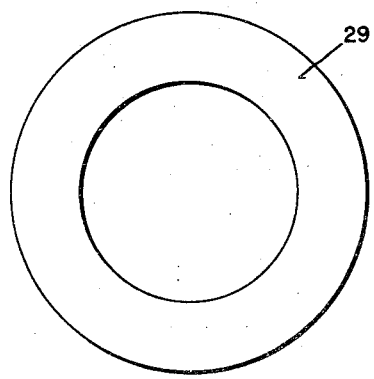
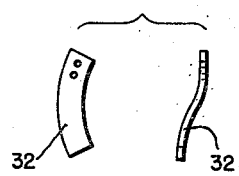
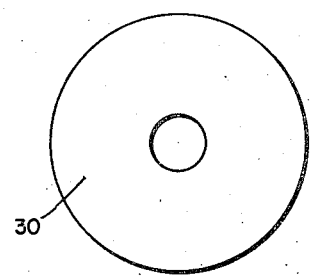
INVENTOR
JESS L. HITE
BY *Everett N. Curtis*
ATTORNEY Patented July 31, 1945

2,380,648

UNITED STATES PATENT OFFICE 2,380,648

COLLET JAW PROTECTOR

Jess L. Hite, Chula Vista, Calif., assignor to Rohr Aircraft Corporation, Chula Vista, Calif., a corporation of California Application September 1, 1944, Serial No. 552,281

7 Claims. (Cl. 279—46)

My invention relates to collet jaw protectors to be employed in hollow spindle lathes used for metal work, and its objects are to prevent metal particles, impinging or cast upon the ends of the exposed jaws of the collet, from gaining entrance to the spaces between said jaws and thereby impairing the operation of the lathe; to effect the attachment of covers or protection to and covering the head of the collet and nose of the spindle so as to cover said jaws and spaces therebetween and to construct such closure means so as to be quickly detachable for replacement or repair; and in general to improve and render more effective the operation of the lathe of which said jaw protector forms part. These and other objects will appear as illustrated in the drawings and as hereinafter set forth and described.

In the form of hollow spindle lathes now in common use for metal work, the spindle thereof is usually constructed with a round central passage having a conical flaring or tapering outlet, within which is removably seated and held the resilient gripping jaws of the collet, shaped to effect close engagement therewith; spaces between said jaws radially extending from a central bore in said collet permitting the said jaws collapsibly to grip the work within said collet. Upon the operation of the lathe, metal particles, including dust, shavings, chips and the like, thrown off from the work, tend to strike against the face of the collet and nose of the spindle and to force entry into the spaces between said jaws and to become irregularly packed therein; with the result that the engagement of the head of the collet with its spindle or with the work gripped by said jaws, is likely to become distorted and run out of true, or the efficiency of the collet mechanism otherwise impaired and even at times rendered inoperative.

Through the use of my collet jaw protectors, however, the entry of metal particles within the exposed openings of the collet is effectively guarded against and prevented. Such protectors are made by me in the form of detachable covers and closure caps, which removably clamped to the spindle over the head of the collet, completely cover the exposed openings between its jaws and thereby keep the same cleared of any matter thrown off from the work.

Attention is hereby directed to the accompanying drawings illustrating a preferred form of my invention, in which similar numerals of designation refer to similar parts throughout the several views, and in which, Figure 1 is an end view of a preferred form of my invention, showing the cap, spring securing clamps affixed thereto and adjacent parts,—the spaced jaws of the collet, cover shield and spring fingers being indicated in dotted lines;

Fig. 3 is a side view of cap and spring securing clamps welded thereto, showing the same detached from the spindle—the spring fingers riveted to the inner wall of the cap being indicated in dotted lines;

Fig. 4 is a view of the cap, clamps and fingers shown in Fig. 3, looking at the same from above;

Fig. 5 is a plan view of the collar normally located between the end of the spindle and nose piece therefor, and serving as catch or means of attachment for the securing clamps;

Fig. 6 is a plan view of the cover shield normally covering the entrances to the spaces between the jaws of the collet, and held in place by the cap and spring fingers riveted to said cap, and Fig. 7 is a plan view and side elevation of one of the spring fingers shown in Figs. 2 and 4, showing the same detached from the cap.

Figure 2:
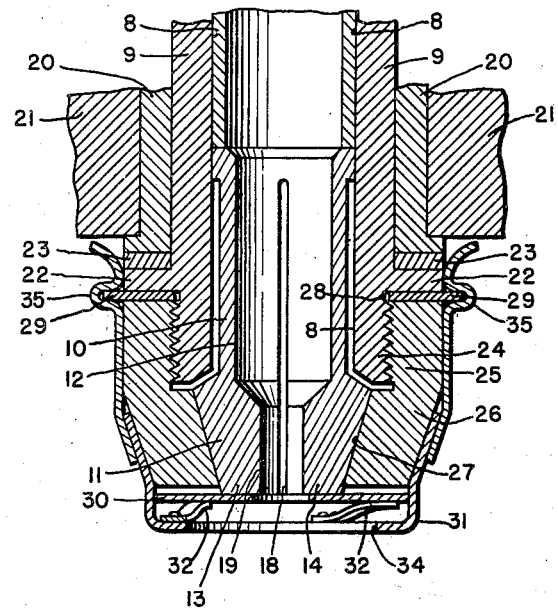
Fig. 2 is a section of my improved construction on line 2—2 of Fig. 1, looking in the direction of the arrows.
Figure 1:
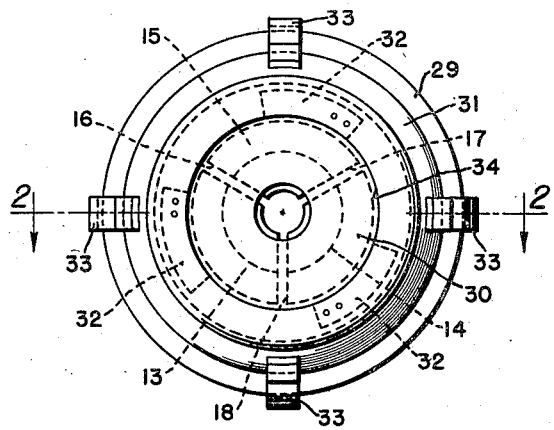

Referring to the drawings, within the hollow 8 of the outer end portion of the spindle 9, forming part of a conventional lathe used for metal work, I install the shank of the push collet 10. This collet 10 is of the customary conventional construction, having the conical tapering head 11, the round bore 12, compressible jaws 13, 14 and 15, spaces or openings 16, 17 and 18 between said jaws, and central passage 19. As here shown, the said end portion of the spindle 9, is conventionally journalled in the bearings 20 in the head casting 21 of the lathe; this end portion having projecting therefrom an annular ridge or lip 22 integral therewith and separated from the bushing 20 by the thrust washer 23, and said end portion having a threaded outer wall 24 engaging with the inner threaded wall 25 of the nose piece 26. The nose piece 26, as is usual in this form of construction, is provided with the conical shaped socket 27 within which is thrust and wedged outer ends of the jaws 13, 14 and 15, comprising the head of the collet 10; such head being shaped to conform with the inner wall of said socket. Upon turning the said nose piece inwardly upon its threads, the said jaws are pressed inwardly upon any work extending through the central passage 19 and serve firmly to hold said work while being turned in the manner well understood in the art. Installed as shown between the ridge 22 and the base of the nose 26, and engaging with the recess 28 in the spindle 9 back of the threaded wall 24, is the collar 29, the outer edge of which serves as a catch for the clamps 33 in the manner hereinafter described.

For the purpose of preventing the ingress within the spaces 16, 17 and 18 between the jaws 13, 14 and 15 of metal particles normally thrown off from the work against the face of the collet through the use of tools in the hands of the workman, I employ a flat shield 30 which completely covers the face of the head of the collet 10 as well as the end of the nose piece 26; an opening being left in the center of said shield conforming to and registering with the central passage 19 of said collet. To secure and maintain said shield in such position, I preferably employ the cap 31, having a large central opening 34, and except for said opening, covering the edges of said shield sides of the nose piece 26 adjacent to the end thereof. Arcuate spring fingers 32 riveted to the inner end wall of said cap, and confined within the same, serve to press constantly against the cap 31 and to close at all times the entrances to the spaces between said jaws. Also to lock said cap firmly in position, I weld or otherwise firmly secure to the sides thereof the spring securing clamps 33, here shown to be four in number and circumferentially disposed around said cap; the ends of each clamp having latches 35 shaped to engage with the catch formed by the outer edge of the collar 29. Upon installing the shield 30 in the position shown in the drawing, and pressing the cap 31 thereover against the spring fingers 32, the clamps 33 may be securely locked in position by engaging their respective latches with the catch of collar 29. If for any reason, it is desired to replace the said cap or to remove the same for repair, it can readily be taken off upon releasing said clamps, and another cap installed; this construction permitting great speed in either attaching or detaching the cap from its mounting as hereinbefore described.

If desired, a greater or less number of the clamps 33 could be welded to the sides of the cap 31, or made integral therewith, provided that a balanced connection is thereby secured to the rim of the collar 29, and provided that the quick attachable and detachable features of said clamps are preserved.

My invention may be embodied in other specific forms without departing from the spirit or essential characteristics thereof. The present embodiment of my invention as hereinbefore set forth is therefore to be considered in all respects as illustrative and not restrictive, the scope of my invention being indicated by the appended claims, and all changes which come within the meaning and range of equivalency of the claims are therefore intended to be embraced therein.

What I claim and desire to secure by Letters Patent, is:

1. In a hollow spindle lathe, the combination of a rotatable hollow spindle, a collet with separated jaws installed within the hollow of said spindle, a shield covering the face of the head of said collet and entrances to the spaces between its jaws, a cap covering said shield and adjacent end and sides of said spindle, and quick detachable spring clamping means for securing said cap to said spindle.

2. In a hollow spindle lathe, the combination of a rotatable hollow spindle, a collet with separated jaws installed within the hollow of said spindle, catches disposed upon the outer wall of said spindle, a shield covering the face of the head of said collet and entrances to the spaces between its jaws, a cap covering said shield and adjacent end and sides of said spindle, and spring clamps secured to said cap, said clamps having quick detachable latches engageable with said catches.

3. In a hollow spindle lathe, the combination of a rotatable hollow spindle, a collet with separated jaws installed within the hollow of said spindle, an endless catch circumferentially disposed in the outer wall of said spindle, a shield covering the face of the head of said collet and entrances to spaces between its jaws, a cap covering said shield and the adjacent end and sides of said spindle, and spring clamps secured to said cap and circumferentially arranged about the same, said clamps having quick detachable latches engageable with the rim of said circumferentially disposed catch.

4. In a hollow spindle lathe, the combination of a rotatable hollow spindle, a collet with separated jaws installed within the hollow of said spindle, catches disposed upon the outer wall of said spindle, a shield covering the face of the head of said collet and entrances to the spaces between its jaws, a cap covering said shield and adjacent end and sides of said spindle, springs secured to the inner wall of said cap and providing resilient contact thereof with the adjacent wall of said shield, and spring clamps secured to the outer wall of said cap, said clamps having quick detachable latches engageable with said catches.

5. In a hollow spindle lathe, the combination of a rotatable hollow spindle, a thrust collet with separated jaws installed within the hollow of said spindle, a catch circumferentially disposed in the outer wall of said spindle, a shield covering the face of the head of said collet and entrances to spaces between its jaws, a cap covering said shield and the adjacent end and sides of said spindle, springs secured to the inner wall of said cap and providing resilient contact thereof with the adjacent wall of said shield, and spring clamps secured to said cap and circumferentially arranged about the same, said clamps having quick detachable latches engageable with the rim of said circumferentially disposed catch.

6. In a hollow spindle lathe, the combination of a rotatable hollow spindle, a thrust collet having an enlarged head with separated jaws the shank of which is installed within the hollow of said spindle, a nose piece securing the said collet head to the outer end of said spindle, a collar with a protruding edge forming a catch held between said spindle and nose piece, a shield covering the face of the head of said collet and the entrances to spaces between its jaws, a cap covering said shield and the adjacent end and sides of said nose piece, and spring clamps secured to said cap and circumferentially disposed about the same, said clamps having quick detachable latches engageable with the protruding edge of said collar.

7. In a hollow spindle lathe, the combination of a rotatable hollow spindle, a thrust collet having an enlarged head with separated jaws the shank of which is installed within the hollow of said spindle, a nose piece securing the said collet head to the outer end of said spindle, a collar with a protruding edge forming a catch held between said spindle and nose piece, a shield covering the face of the head of said collet and the entrances to spaces between its jaws, a cap covering said shield and the adjacent end and sides of said nose piece, springs secured to the inner wall of said cap and providing resilient contact thereof with the adjacent upper face of said shield, and spring clamps secured to said cap and circumferentially disposed about the same, said clamps having quick detachable latches engageable with the protruding edge of said collar.

JESS L. HITE.